United States Patent
Kawano et al.

(10) Patent No.: US 10,032,029 B2
(45) Date of Patent: Jul. 24, 2018

(54) VERIFYING INTEGRITY OF BACKUP FILE IN A MULTIPLE OPERATING SYSTEM ENVIRONMENT

(71) Applicant: LENOVO (Singapore) PTE, LTD., New Tech Park (SG)

(72) Inventors: Seiichi Kawano, Sagamihara (JP); Kenji Oka, Yokohama (JP); Randall Scott Springfield, Chapel Hill, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 411 days.

(21) Appl. No.: 14/330,862

(22) Filed: Jul. 14, 2014

(65) Prior Publication Data
US 2016/0012233 A1   Jan. 14, 2016

(51) Int. Cl.
*G06F 21/64* (2013.01)
*G06F 21/57* (2013.01)
(Continued)

(52) U.S. Cl.
CPC ............ *G06F 21/575* (2013.01); *G06F 9/441* (2013.01); *G06F 21/6209* (2013.01);
(Continued)

(58) Field of Classification Search
CPC ........ G06F 21/575; G06F 21/71; G06F 21/74; G06F 21/602; G06F 21/62; G06F 9/4406;
(Continued)

(56) References Cited

U.S. PATENT DOCUMENTS 3,996,449 A * 12/1976 Attanasio ............... G06F 21/31
  235/431
6,138,236 A * 10/2000 Mirov ....................... G06F 9/24
  712/E9.007
(Continued)

FOREIGN PATENT DOCUMENTS

JP   07-200112 A    8/1995
JP   2001500293 A   1/2001
(Continued)

OTHER PUBLICATIONS

Friedl, Steve J. "Steve Friedl's Unixwiz.net Tech Tips." An Illustrated Guide to Cryptographic Hashes. May 9, 2005. Web. Aug. 17, 2016. <http://www.unixwiz.net/techtips/iguide-crypto-hashes.html>.*

(Continued)

*Primary Examiner* — Jaweed A Abbaszadeh
*Assistant Examiner* — Brian J Corcoran
(74) *Attorney, Agent, or Firm* — Kunzler, PC

(57) ABSTRACT

Provided is a technique to enhance security of a computer in a multi-OS operating environment. A memory image of a primary OS is in an active state, and a memory image of a secondary OS is in a non-active state. When switching is performed from the primary OS to the secondary OS, a runtime image is created, and a digest P is calculated and encrypted (C). When switching is performed from the secondary OS to the primary OS, a digest of the stopped runtime image is calculated. Only when comparison between the decrypted digest P and the calculated digest shows agreement, is switching of the primary OS allowed.

18 Claims, 8 Drawing Sheets

(51) Int. Cl.
*G06F 9/4401* (2018.01)
*G06F 21/62* (2013.01)
*H04L 9/32* (2006.01)
*H04L 9/08* (2006.01)

(52) U.S. Cl.
CPC ............ *G06F 21/64* (2013.01); *H04L 9/0825* (2013.01); *H04L 9/0897* (2013.01); *H04L 9/3234* (2013.01)

(58) Field of Classification Search
CPC ........ G06F 21/31; G06F 21/64; G06F 9/4403; G06F 21/51; G06F 21/53; G06F 21/562; G06F 21/57; G06F 21/72; G06F 21/78; G06F 21/79; G06F 21/6209; H04L 9/3234
See application file for complete search history.

(56) References Cited

U.S. PATENT DOCUMENTS

| | | | | |
|---|---|---|---|---|
| 7,809,957 B2* | 10/2010 | Grawrock | ............... | G06F 21/57 713/165 |
| 7,913,086 B2 | 3/2011 | Kostiainen et al. | | |
| 8,375,440 B2 | 2/2013 | Ray et al. | | |
| 8,627,464 B2* | 1/2014 | Thom | ............... | G06F 21/57 726/22 |
| 8,782,388 B2* | 7/2014 | Senda | ............... | G06F 21/575 713/2 |
| 9,152,793 B2* | 10/2015 | Futral | ............... | G06F 21/572 |
| 9,251,343 B1* | 2/2016 | Vincent | ............... | G06F 21/575 |
| 9,268,941 B1* | 2/2016 | Akdemir | ............... | G06F 9/4418 |
| 9,372,996 B2* | 6/2016 | Dolph | ............... | G06F 17/30 |
| 9,563,457 B2* | 2/2017 | Lukacs | ............... | G06F 9/45558 |
| 2001/0018717 A1* | 8/2001 | Shimotono | ............. | G06F 9/441 719/319 |
| 2002/0116632 A1* | 8/2002 | Itoh | ............... | G06F 21/10 726/34 |
| 2003/0105783 A1* | 6/2003 | Oshima | ............... | G06F 9/45537 |
| 2004/0003273 A1* | 1/2004 | Grawrock | ............... | G06F 21/79 713/193 |
| 2004/0148536 A1 | 7/2004 | Zimmer et al. | | |
| 2005/0010752 A1* | 1/2005 | Solsona | ............... | G06F 21/554 713/151 |
| 2005/0044433 A1* | 2/2005 | Dunstan | ............... | G06F 21/62 713/320 |
| 2005/0166024 A1* | 7/2005 | Angelo | ............... | G06F 21/575 711/164 |
| 2005/0273663 A1 | 12/2005 | Yoon | | |
| 2005/0283601 A1* | 12/2005 | Tahan | ............... | G06F 21/575 713/2 |
| 2006/0070032 A1* | 3/2006 | Bramley | ............... | G06F 9/485 717/124 |
| 2006/0155988 A1* | 7/2006 | Hunter | ............... | G06F 21/575 713/164 |
| 2008/0184274 A1* | 7/2008 | Ohta | ............... | G06F 9/485 719/319 |
| 2008/0201592 A1* | 8/2008 | Lawrence | ........ | G01R 31/31719 713/323 |
| 2008/0288762 A1* | 11/2008 | Chen | ............... | G06F 21/575 713/2 |
| 2010/0122077 A1 | 5/2010 | Durham | | |
| 2012/0297177 A1* | 11/2012 | Ghosh | ............... | G06F 21/53 713/2 |
| 2013/0166819 A1* | 6/2013 | Yerushalmi | ........... | G06F 3/0625 711/103 |
| 2013/0227269 A1* | 8/2013 | Ting | ............... | G06F 21/45 713/100 |
| 2014/0082724 A1* | 3/2014 | Pearson | ............... | G06F 21/575 726/22 |
| 2015/0200934 A1* | 7/2015 | Naguib | ............... | G06F 21/57 713/2 |

FOREIGN PATENT DOCUMENTS

| | | |
|---|---|---|
| JP | 2001-256066 | 9/2001 |
| JP | 2002312242 A | 10/2002 |
| JP | 2008046887 A | 2/2008 |
| WO | 2014042650 A1 | 3/2014 |

OTHER PUBLICATIONS

Sun, Jun, Dong Zhou, and Steve Longerbeam. "Supporting Multiple OSes with OS Switching." USENIX Annual Technical Conference. 2007.*
Federal Inf. Process. Stds. (NIST FIPS)—198-1.*
Schneier, Bruce. "Applied cryptography: protocols, algorithms, and source code in C." New York: Wiley (1996).*
Youd, David. "What is a Digital Signature?" What is a Digital Signature?, David Youd, Nov. 15, 2012, www.youdzone.com/signature.html.*

* cited by examiner

VERIFYING INTEGRITY OF BACKUP FILE IN A MULTIPLE OPERATING SYSTEM ENVIRONMENT

FIELD

The present application relates to techniques to enhance security of a computer, and further relates to techniques to verify integrity of a backup file that is created by an operating environment that stops in a computer operating in plural operating environments.

BACKGROUND

Since computers are exposed to various attacks such as tampering of installed software and embedding of malware, they are required to detect such an attack received and cope with it appropriately. When the power supply of a computer is activated, a boot program is loaded in the order of the BIOS, a boot loader, an operating system (OS), and applications, for example. If such a boot program as a whole is not changed from the beginning of the manufacturing and the order of load is not changed, it can be said that the operating environment at least at the time when the boot is completed is safe.

A known method to examine a change of the boot program and the order of boot includes a technique called Trust Boot based on the credibility of a security chip named Trusted Platform Module (TPM) whose operation is specified by the Trusted Computing Group (TCG). Starting from a code named a Core Root of Trust Measurement (CRTM) that is physically protected from rewriting, Trust Boot records hash values calculated for codes that are to be booted next one by one on a Platform Configuration Register (PCR) mounted in the TPM.

The PCR cannot be reset until the power supply of the computer is restarted. A program cannot rewrite a PCR value recorded in the PCR into any value, but can read the value as needed. If a PCR value that is calculated when a certain program is executed at any timing agrees with the PCR value recorded in the PCR, then it can be confirmed that the program does not change from the time when the PCR value is written in the PCR.

The Unified Extensible Firmware Interface (UEFI) forum has developed the specifications of a new system firmware (UEFI firmware) that is used instead of BIOS or in addition to BIOS. The UEFI firmware supports safety measure named Secure Boot to stop booting if it detects alteration of the OS. Secure Boot is configured so that the UEFI firmware performs a handoff to a boot loader to load an OS that a boot disk stores at the time of startup, thus passing a control thereto.

The boot loader requests the UEFI firmware to load a boot image of the OS to a system memory. Then the UEFI firmware decrypts a digital certificate attached to the boot loader with a public key of the manufacturer, and if it does not agree with a hash value at that time that is calculated from the boot loader by comparison, boot is stopped. When the boot loader from when the OS is stored in the startup disk for the first time and the boot loader at the time of subsequent boot keep their identity completely, then it can be said that the legitimate OS is loaded without embedded malware to guide a boot destination.

SUMMARY

One method to implement a multi-OS operating environment to switch to any one of a plurality of OSs installed is to boot any selected OS for execution and shift the OS to a power-off state before switching to boot another OS. This method, however, takes time to change the operating environment. On the other hand, a further method loads a plurality of OSs at the same time to divided logical memory blocks, and leaves a memory image of the OS to be stopped in the logical memory block, which is convenient because the operating environment can be switched in a short time.

Instead of dividing the system memory into logical memory blocks, a memory image of the OS to be stopped may be saved in a non-volatile memory like a hibernation file, and switching may be performed by repeating resumption and saving from one OS to another OS. This can shorten the switching time as compared with the case of switching via a power-off state. Virtual environment may be configured on one hardware environment, and a plurality of OSs may be operated in the environment and be switched in a short time. Hereinafter switching of operating environments not via a power-off state is called a fast switching.

Such a fast switching allows a memory image (backup file) of a resumable OS stopping the operation to be left in a non-volatile storage such as a system memory or a disk drive while another OS operates. In the case of the aforementioned Trust Boot or Secure Boot, integrity of software can be guaranteed at the time when the boot is completed. After that, the operating OS can protect the memory image existing in its own memory space by managing it by itself or with a virus detection program or the like. However, a backup file, which exists in a different memory space such as a system memory or a disk drive that stops the operation, cannot be protected in a similar manner.

In the multi-OS operating environment, every time the operating environment is changed, a backup file is left in the system memory or the disk drive, and so there arises a need to verify the integrity of the backup file. Such verification of the backup file in the multi-OS operating environment also has to be performed so as not to interfere with a fast switching. Additionally the integrity has to be verified under the environment with secured high reliability. It is effective to verify the integrity without changing the OSs making up the operating environment in order to be compatible with most or all OSs.

The present application provides a method to verify integrity of a backup file in a computer capable of operating in any one of a plurality of operating environments. In response to switching operation from a first operating environment to a second operating environment, a representative file enabling verification of identity of a first memory image at least at a part, the first memory image making up the first operating environment, is encrypted. Next, the first memory image is saved at a predetermined place. Next, the encrypted representative file is decrypted in response to switching operation from the second operating environment to the first operating environment. Then a representative file extracted from the saved first memory image is compared with the decrypted representative file.

With this configuration, at the time of the switching operation from the second operating environment to the first operating environment, integrity of the first memory image at least at a part can be verified via the representative file. The representative file may be a file that can verify the integrity of the first memory image at least at a part, which may be the entire first memory image, a kernel part, or a runtime image. The representative file may be a digest that is obtained by hash calculation of the first memory image as a whole or a part thereof. The encrypted representative file may be saved at the same place as that for the first memory image or may be saved at a different place. A system firmware may perform encryption, saving, decryption and comparison, whereby switching of the operating environments can be performed safely while verifying the integrity, compared with the operating environment of the OS. In that case, there is no need to change the OS.

Encryption at this time may be performed while securing the safety of an encryption key by using an encryption key that is stored at a SMRAM area, to which only a SMI handler of the system firmware can access. At this time, a public key and the encryption key may be stored in a volatile memory to store the system firmware, an encrypted private key may be stored at the SMRAM area, and the representative file may be decrypted with the public key. Since the encryption key is encrypted, the key can be stored safely without a need of a non-volatile memory with a security measure taken.

Encryption and decryption of the private key may be performed in association with PCR values stored in secure registers to verify integrity of the system software by a security chip (TPM). Encryption may be performed using a common key that is stored in a non-volatile memory, to which the system firmware only can access. The predetermined place may be an address space of a system memory that is divided from a physical address space where the second operating environment operates.

The predetermined place may be a disk drive that stores boot images of the first operating environment and the second operating environment. In response to switching operation from the second operating environment to the first operating environment, a representative file enabling verification of identity of a second memory image at least at a part, the second memory image making up the second operating environment, is encrypted. The second memory image is saved at a predetermined place. The encrypted representative file is decrypted in response to switching operation from the first operating environment to the second operating environment. A representative file extracted from the saved second memory image is compared with the decrypted representative file.

BRIEF DESCRIPTION OF THE DRAWINGS

In order that the advantages of the application will be readily understood, a more particular description of the application briefly described above will be rendered by reference to specific embodiments that are illustrated in the appended drawings. Understanding that these drawings depict only typical embodiments of the application and are not therefore to be considered to be limiting of its scope, the application will be described and explained with additional specificity and detail through the use of the accompanying drawings, in which.

DETAILED DESCRIPTION

Figure 1:
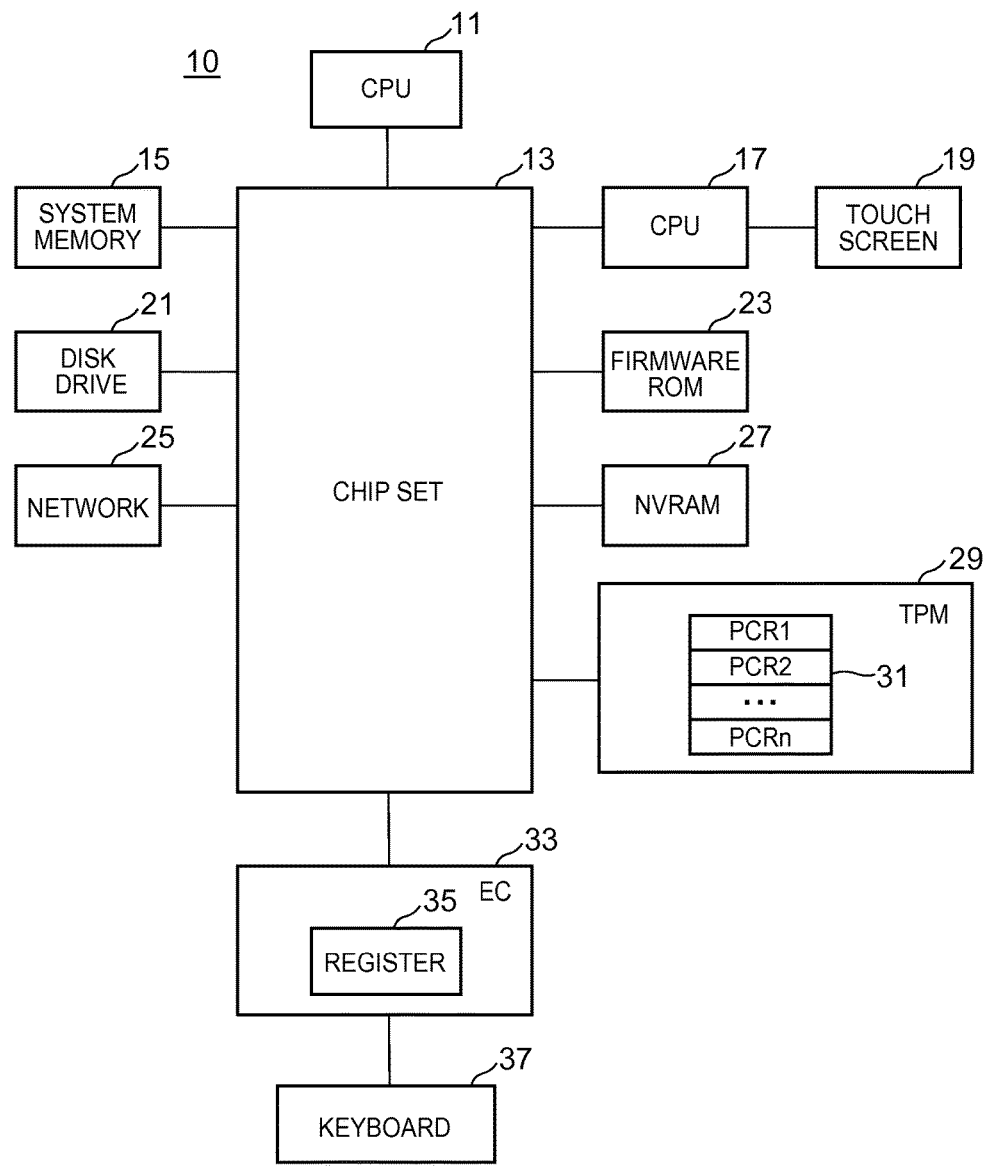
FIG. 1 is a block diagram to describe the overall configuration of hardware of a computer that may be used in conjunction with the present invention.
Figure 2:
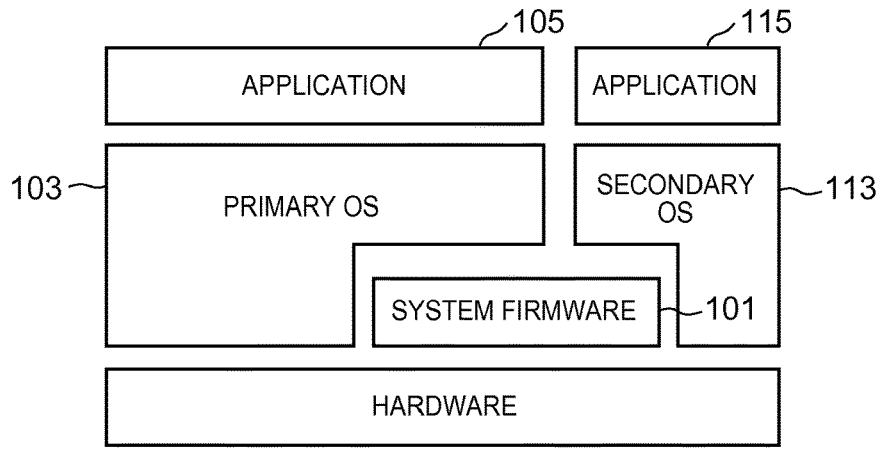
FIG. 2 describes the configuration of software installed in the computer of FIG. 1.

FIG. 1 is a functional block diagram to describe the overall configuration of hardware of a laptop or desktop computer 10. FIG. 2 describes the configuration of software installed in the computer 10. Since many parts of the hardware and the software are known in configuration, the present specification describes the elements in a range necessary to understand the present application. In FIG. 1, a chip set 13 is equipped with an interface function for various standards, to which a CPU 11, a system memory (RAM) 15, a GPU 17, a disk drive 21 such as a HDD or a SSD, a firmware ROM 23, a network module 25, a lockable non-volatile memory (NVRAM) 27, a security chip (TPM) 29 specified by the TCG, an embedded controller (EC) 33 and the like are connected.

A touch screen 19 is connected to the GPU 17. The touch screen 19 is not essential to embody the present application, which can be used to provide a user interface by touch operation in the operating environment of a secondary OS 113, for example. The disk drive 21 is a boot disk, which stores, in the present embodiment, a bootable primary OS 103, an application 105 that operates on the primary OS 103, a bootable secondary OS 113, an application 115 that operates on the secondary OS 113, and the like as shown in FIG. 2.

In one example, the primary OS 103 may be a large-scale program such as Windows (registered trademark) or MAC_OS (registered trademark), and the secondary OS 113 may be a small-scale program such as Android (registered trademark) or embedded Linux (registered trademark), and the types of OSs to which the present application is applicable are not limited especially. The disk drive 21 may store three types or more of bootable OSs. In the present application, the primary OS 103 and the secondary OS 113 may be stored in different boot disks.

The firmware ROM 23 stores a system firmware 101 such as BIOS or UEFI firmware that supports Secure Boot. The system firmware 101 examines and initializes the device at the time of startup of the computer, and performs processing to verify integrity of a backup file according to the present embodiment. Every time the CPU 11 is reset by any one of the methods of power-on reset to restart the power supply of the CPU 11, hardware reset to send a reset signal to the CPU 11 and software reset to let a program executed by the CPU 11 generate a reset signal, the CPU 11 always executes the system firmware 101 from a predetermined address (reset vector).

The NVRAM 27 is a lockable non-volatile memory, to which the system firmware 101 only can access. The NVRAM 27 can be used to store a common key that is used in one example of the present embodiment. The NVRAM 27 is unlocked when the CPU 11 is reset. The system firmware 101 can lock the NVRAM 27 when passing access right of the CPU 11 to the OS. The configuration of the TPM 29 is known. The TPM 29 is equipped with an integrity verification function to verify whether the platform is genuine and conforms to the TCG, an integrity recording function to check whether hardware and software are not tampered, a protection function of an encryption key not to release the encryption key stored internally to the outside and a function to process various codes.

The TPM 29 includes a Platform Configuration Register (PCR) 31 to record integrity of software to implement Trust Boot. A boot module for the system firmware 101, the primary OS 103, and the secondary OS 113 calculates a hash value of the subsequent module one by one at the time of boot, and writes it to the PCR 31 using an Extend command. When the Extend command is issued, the TPM calculates the new PCR value as: HASH (old PCR value+hash value), and records the new PCR value at a predetermined position of the PCR 31.

The PCR value once recorded is not allowed to be rewritten or deleted before reboot. Thus, it is difficult for software to change the PCR value recorded once to any value. The system firmware and the OS can verify the integrity of software by a known method using the PCR value. In one example, the PCR 31 includes twenty-four registers from PCR[0] to PCR[23], and the TCG specifies how to use them.

For instance, the system firmware 101 can write calculated hash values at seven PCRs from PCR[0] to PCR[7]. In an example in relation to the present embodiment, PCR[0] is used to record a PCR value corresponding to the hash value calculated by the CRTM, and PCR[4] is used to record a PCR value corresponding to the hash value of the boot loader of the OS. The existence of PCR[0] and PCR[4] are known, and the present application performs verification of a backup file while using PCR[0] and PCR[4] in one example to make sure that it is the operating environment of the system firmware 101 after starting from the CRTM and before passing the access right of the CPU 11 to the OS. Although the TPM 29 implements Trust Boot, the present application is applicable to a system that does not use Trust Boot as well.

Figure 3:
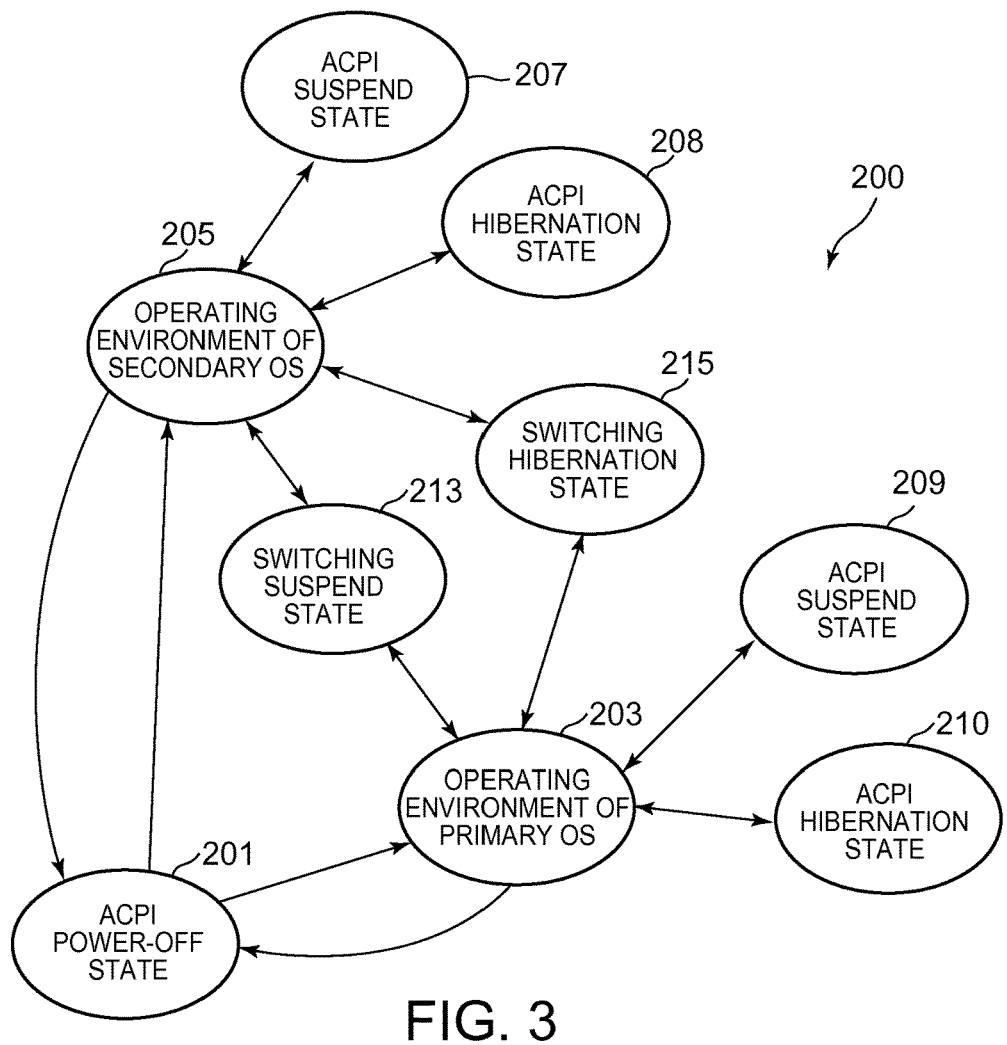
FIG. 3 shows status transition to describe a status change of the computer of FIG. 1 in dual-OS operating environment and describe software attacks that may be directed toward a backup file.

The EC 33 is a microcomputer including a CPU, a RAM, a ROM and the like, and controls the power supply of the computer 10 and manages temperature inside the chassis, for example. The EC 33 includes a register 35 that the system firmware 101, the primary OS 103, and the secondary OS 113 can use. The register 35 stores status information that the system firmware 101 refers to at the time of boot to select a boot OS and determine a shift destination of the operating state, for example. A keyboard 37 is connected to the EC 33. The keyboard 37 functions as a user interface in the operating environment of the primary OS 103 in one example FIG. 3 shows status transition to describe status change of the computer 10 in dual-OS operating environment 200 and describe software attacks that are expected for a backup file. Herein, the operating environment is made up of a memory image that the system memory 15 stores during the operation of program codes such as the OSs and applications, data indicating the status of a program and user data created by an application, and a status information (system context) to indicate the internal status that registers, cashes, pointers and the like of all of the hardware including the CPU 11 operating under the operating environment have. The number of operating environments agrees with the number of OSs installed. The present specification describes a method to protect a backup file when switching between two operating environments (dual-OS operating environment), and the present application is applicable to the protection of a backup file when switching among three or more operating environments (multi-OS operating environment) as well.

The computer 10 transits from a power-off state (S5 state) 201 specified by the ACPI to either one of operating environment 203 of the primary OS 103 and operating environment 205 of the secondary OS 113. Herein the computer 10 can shift from the power-off state 201 to a single-OS operating environment as well. In the operating environment 203 of the primary OS, the primary OS 103 is executed in the state where a runtime image making up the operating state immediately before stopping of the operation of the secondary OS 113 is saved in the system memory 15 or the disk drive 21. The runtime image is made up of a memory image and system context.

The system context is stored in the system memory 15 before the device stops or in response to the switching operation to the other operating environment, thus forming a part of the runtime image. Similarly, in the operating environment 205 of the secondary OS, the secondary OS 113 is executed in the state where a runtime image of the primary OS 103 is saved in the system memory 15 or the disk drive 21.

From the operating environment 203 of the primary OS and the operating environment 205 of the secondary OS, the computer can restore the original state by letting the running OS only transit to the suspend states 207 and 209 specified by the ACPI without changing the stopping operating environment. Alternatively, from the operating environment 203 of the primary OS and the operating environment 205 of the secondary OS, the computer can restore the original state by letting the running OS only transit to the hibernation states 208 and 210 specified by the ACPI without changing the stopping operating environment. Herein when transiting to the hibernation states 208 and 210, the contents stored in the system memory 15 are kept to keep the stopping operating environment. A method to verify integrity of a backup file of the present application is applicable to the suspend states 207, 209 or the hibernation state 208, 210 as well.

Switching between the operating environment 203 of the primary OS and the operating environment 205 of the secondary OS can be performed in a short time bidirectionally via either one of a switching suspend state 213 and a switching hibernation state 215. Herein, the switching suspend state 213 and the switching hibernation state 215 refer to a state, for switching of operating environments of the system, where a runtime image of the OS operating at that time is temporarily saved at the system memory 15 or the disk drive 21, and then the CPU 11 is reset and the system firmware 101 is executed. During the switching suspend state 213, the power supply of the system memory 15 is retained, and the memory therein is also retained. Meanwhile, during the switching hibernation state 215, the power supply of the system memory 15 can be stopped temporarily. During the switching suspend state 213 and the switching hibernation state 215, the network module 25 can be stopped so as to form environment disconnected from a network.

When switching of the operating environments ends, the runtime image that is saved in the system memory 15 or the disk drive 21 becomes active, and the operating environment after shifting starts. Herein, a runtime image being saved (backup file) exists in the system memory 15 or the disk drive 21 under the operating environment 203 of the primary OS, the operating environment 205 of the secondary OS, the suspend states 207, 209 or the hibernation states 208, 210.

The backup file, which then becomes active for execution, may be attacked during saving, such as embedding of malware or tampering. The present embodiment verifies integrity of the backup file before the backup file becomes active and stops the execution by the following procedure.

Figure 4:
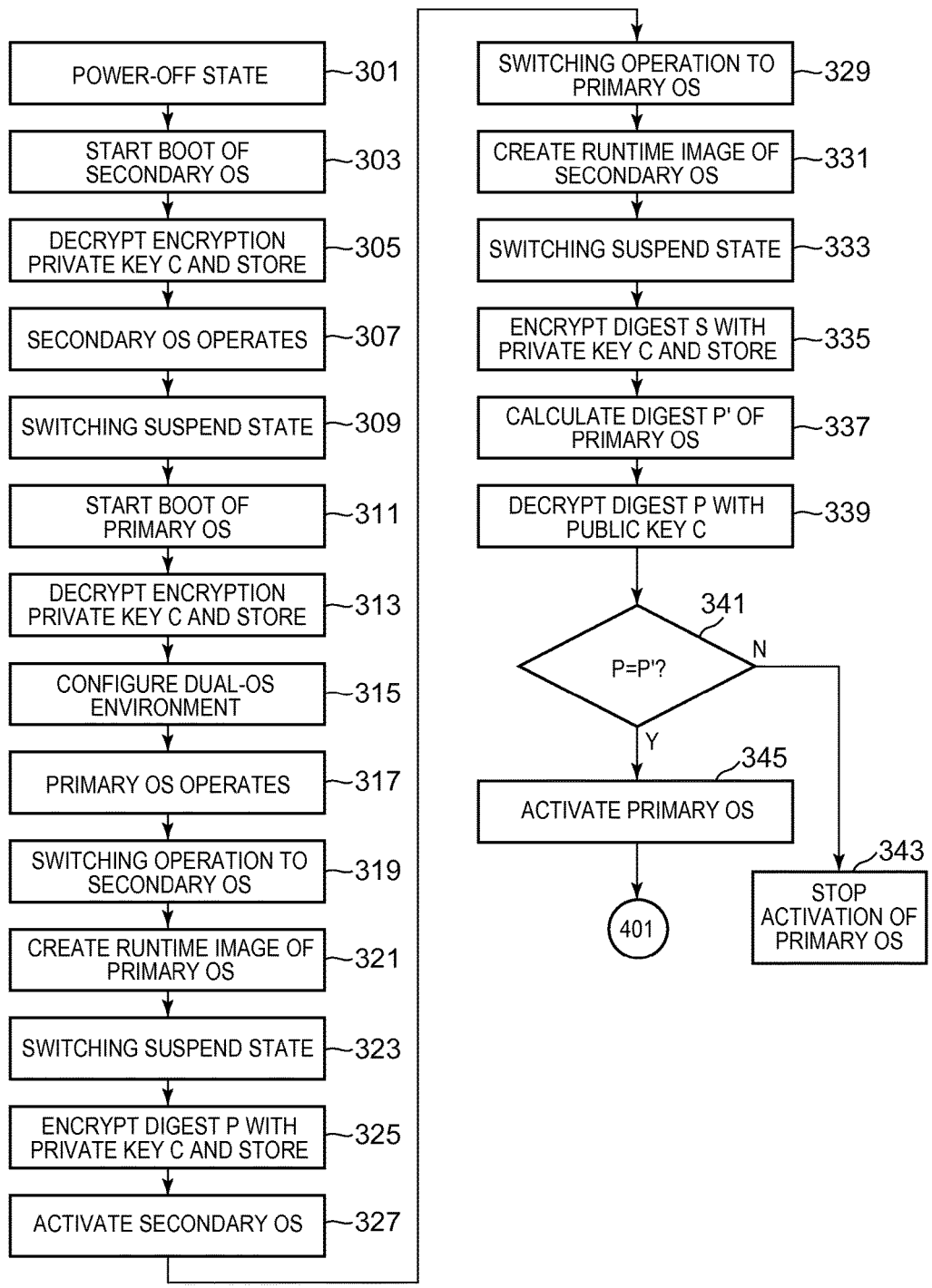
FIG. 4 is a flowchart to describe the procedure to protect a backup file that is saved in a system memory in dual-OS operating environment.
Figure 5:
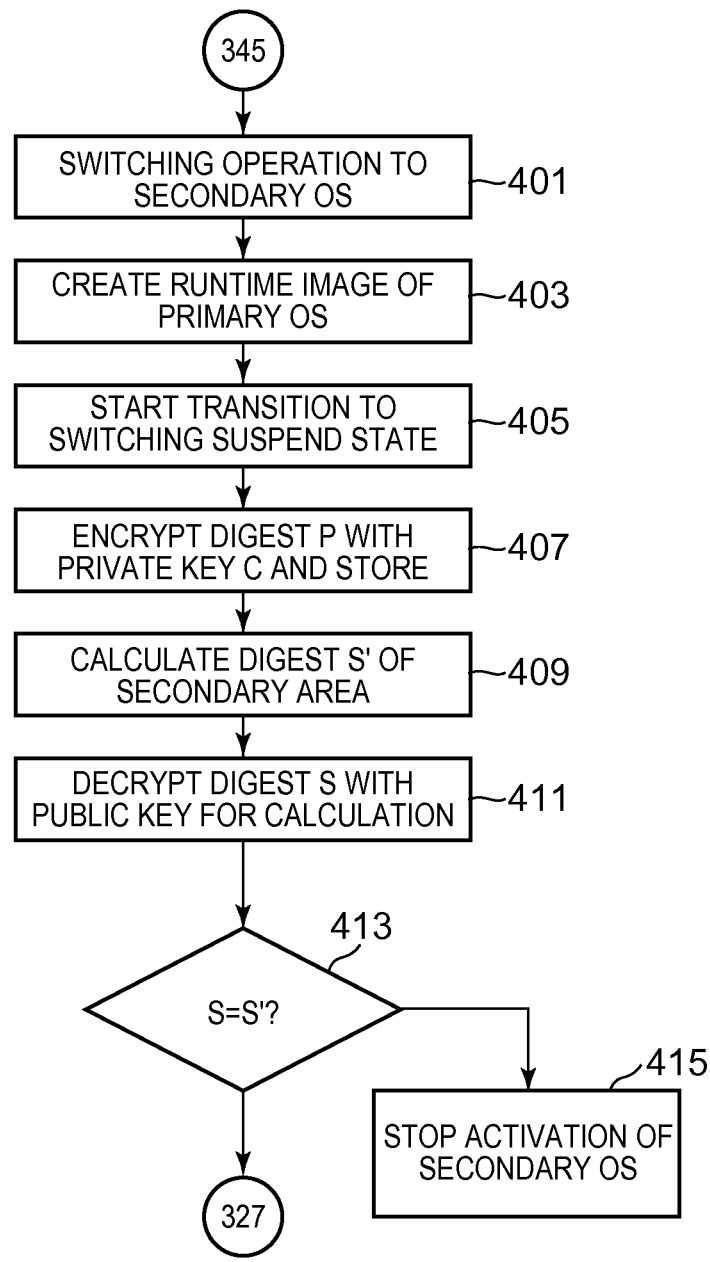
FIG. 5 is a flowchart to describe procedure to protect a backup file that is saved in a system memory in dual-OS operating environment.
Figure 6:
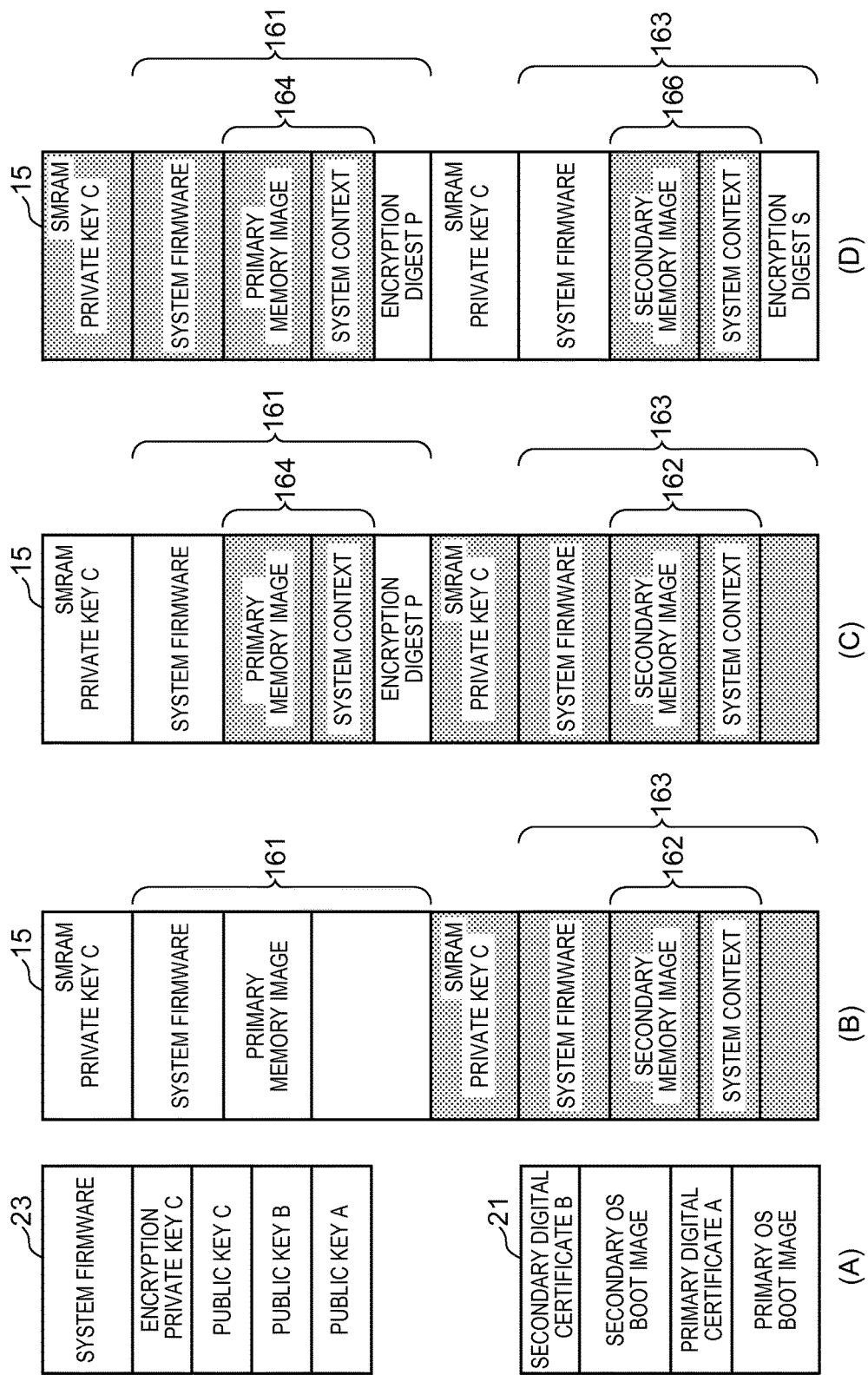
FIG. 6 describes transition of a data configuration of the system memory corresponding to FIGS. 4 and 5.

FIGS. 4 and 5 are flowcharts to describe the procedure to protect a backup file that is saved in the system memory 15 in the dual-OS operating environment. FIG. 6 describes corresponding transition of the data configuration in the system memory 15. At block 301, the computer 10 is in the power-off state 201 (FIG. 3).

As shown in FIG. 6(A), the firmware ROM 23 stores a system firmware 101, an encrypted private key C, a public key C that is created as a pair of the private key C, a public key B to decrypt a digital certificate B attached to a boot loader of the secondary OS 113 and a public key A to decrypt a digital certificate A attached to a boot loader of the primary OS 103. The pair of the private key C and the public key C can be created with a cryptographic module installed in the computer 10 at the time of shipment of the computer 10 or at any time. For the private keys A and B corresponding to the public keys A and B, their secrecy is held by the manufacturers of the OSs.

Since the degree of reliability to verify integrity of a backup file depends on the degree of protection of the private key C being stored and being used, the private key C has to be protected reliably. In one example, the system firmware 101 protects the private key C using the TPM 29. When creating the pair of the private key C and the public key C, the system firmware 101 passes the private key C for encryption to the TPM 29 while designating PCR[0] and PCR[4]. Then the TPM 29 encrypts the private key C in association with the PCR values recorded in PCR[0] and PCR[4], and returns it to the system firmware 101. The system firmware 101 stores the encrypted private key C in the firmware ROM 23 or another non-volatile memory. Since the private key C is encrypted, there is no need to store the private key C in a lockable non-volatile memory.

The TPM 29 does not decrypt the encrypted private key C unless the PCR values stored in PCR[0] and PCR[4] that are designated during encryption and the PCR values of PCR[0] and PCR[4] that are designated when decryption is requested agree with each other. Such encryption processing by the TPM is called sealing. The private key C is encrypted by the TPM 29 while using PCR[0] and PCR[4] as unseal conditions. This means that the private key C sealed by the TPM 29 cannot be unsealed (decrypted) without a boot module of the system firmware 101 having integrity.

The disk drive 21 stores a boot image of the primary OS 103 and a digital certificate A that is an encrypted hash value of the boot loader with the private key A at a predetermined partition. The disk drive 21 further stores a boot image of the secondary OS 113 and a digital certificate B that is an encrypted hash value of the boot loader with the private key B at another partition.

The digital certificates A and B are prepared by encrypting hash values of the primary OS 103 and the secondary OS 113 by the manufacturers of their OSs with the private keys A and B, respectively. At block 303, the power supply is activated, and the secondary OS 113 is booted first. The primary OS 103 may be booted first by setting the system firmware 101 as such.

Only when the decrypted value of the digital certificate B using the public key B by the method of Secure Boot and the hash value calculated from the boot loader of the secondary OS agree, the system firmware 101 permits the booting of the secondary OS 113. Secure Boot may be similarly performed for the primary OS 103 as well by decrypting the digital certificate A using the public key A.

The system firmware 101 assigns a predetermined physical address space 163 (FIG. 6(B)) of the system memory 15 to the secondary OS 113 to start initialization and authorization of hardware. The boot module following the CRTM of the system firmware 101 records hash values that are calculated sequentially to the PCR 31 from PCR[0] to PCR[7]. At block 305, the system firmware 101 requires the TPM 29 to decrypt (unseal) the encrypted private key C while designating PCR[0] and PCR[4]. If the PCR value when creating the private key C and the current PCR value agree, the TPM 29 decrypts the encrypted private key C and returns it to the system firmware 101.

In this way, the private key C is decrypted only under the boot sequence and the boot module having integrity starting from the CRTM. The system firmware 101 issues SMI, makes the CPU 11 shift to System Management Mode (SMM), and stores the decrypted private key C at a SMRAM area corresponding to the physical address space 163 of the system memory 15. In the SMM, only a SMI handler can operate at the SMRAM area, and so the safety of the private key C is secured.

The SMRAM area stores the SMI handler to encrypt a runtime image using the private key C. At block 307, boot sequence is shifted from the system firmware 101 to the secondary OS 113, and shifting to the operating environment 205 of the secondary OS is performed. At this time, however, since the dual-OS operating environment is still being constructed, the application 115 makes a request to the secondary OS 113 so as to boot the primary OS 103 immediately after the boot ends.

Similarly to the transition to the suspend state 207, the secondary OS 113 creates a runtime image 162, and then at block 309, the computer transits to the switching suspend state 213. When the computer transits to the switching suspend state, the memory of the system memory 15 is kept and the operating environment 205 of the secondary OS 113 stops. The runtime image 162 stored in the system memory 15 at this time is a backup file. The reset CPU 11 executes the system firmware 101.

The system firmware 101 refers to the register 35, and at block 311, starts booting of the primary OS 103. At this time, the system firmware 101 assigns a physical address space 161 that is different from that for the secondary OS 113 to the primary OS 103. At block 313, the private key C is decrypted by the TPM 29 in the same procedure as that of block 305, and is stored at a SMRAM area corresponding to the physical address space 161.

When the boot of the primary OS 103 ends, at block 315, dual-OS operating environment 200 is configured. In the dual-OS operating environment 200 that is configured using the system memory 15, memory images of the operating environment 203 of the primary OS and the operating environment 205 of the secondary OS are stored at the mutually segmented physical address spaces 161 and 163, respectively, of the system memory 15, whereas one of them becomes active for operation and the other becomes inactive for saving.

The procedure from block 301 to block 317 can be progressed automatically when the power supply is activated in the power-off state. When the primary OS 103 is booted first, the procedure shifts to the operating environment 205 of the secondary OS when the dual-OS operating environment 200 is configured. FIG. 6(B) shows the data configuration of the system memory 15 at this time. At block 317, the computer 10 operates in the operating environment 203 of the primary OS, where a user works.

At block 319, the user performs switching operation to shift to the operating environment 205 of the secondary OS using the keyboard 37 or the touch screen 19 through a user interface provided by the application 105. At block 321, the primary OS 103 stores the system context at the system memory 15 to create a runtime image 164 (FIG. 6(C)), and at block 323, the computer shifts to the switching suspend state 213. The reset CPU 11 executes the system firmware 101. The system firmware 101 refers to the register 35, thus recognizing that the computer transits to the switching suspend state 213.

When the computer transits to the switching suspend state, the system firmware 101 issues SMI to execute a SMI handler. At block 325, the SMI handler hashes the runtime image 164 of the primary OS, calculates a digest P, and encrypts it with the private key C. Herein the runtime image 164 as a target of the hash value calculation may be the entire area of the physical address space 161 assigned to the primary OS 103 or a part of the physical address space 161 such as a data storage area in the physical address space 161, the entire memory image, or an area to store kernel of the OS in the memory image. The system firmware 101 may be informed of the range of encryption by the OS through a shared space of the system memory 15.

The SMI handler stores the encrypted digest P at the physical address space 161. FIG. 6(C) shows the data configuration of the system memory 15 at this time. At block 327, the system firmware 101 passes the access right of the CPU 11 to the secondary OS 113 for activation. Then the system context is restored and shifting to the operating environment 205 of the secondary OS is performed, where a user is allowed to work. At block 329, the user performs switching operation to shift to the operating environment 203 of the primary OS through a user interface. At block 331, similarly to block 321, the secondary OS 113 creates a runtime image 166, and then at block 333 the computer shifts to the switching suspend state 213.

At block 335, the SMI handler calculates a digest S of the runtime image 166 by procedure similar to block 325, encrypts it with the private key C and stores it at the physical address space 163. FIG. 6(D) shows the data configuration of the system memory 15 at this time. At block 337, the system firmware 101 calculates a digest P' for the same target as the target of the primary OS 103 when calculating the digest P at block 325 before activating the primary OS 103.

At block 339, the system firmware 101 decrypts the encrypted digest P that is stored at the physical address space 161 with the public key C read from the firmware ROM 23. When comparison at block 341 between the digest P and the digest P' results in disagreement, the system firmware 101 stops activation of the primary OS 103 at block 343. When they agree, the runtime image 164 that is saved immediately before the activation can be said to be identical with the runtime image 164 that is created immediately after the switching operation in the range of the digest calculated. This state refers to the backup file having integrity.

When they agree, the procedure shifts to block 345, where the access right of the CPU 11 is passed to the primary OS 103 for activation. Then the system context is restored, and the primary OS 103 restores the state where the runtime image is created at block 321. If an attacker tries to make them identical intentionally, they have to alter the digest P and the digest P' at the same time. However, as long as the safety of the private key C is secured, the digest P cannot be altered so as to keep identical with the digest P', and so alteration, if any, can be detected, and activation can be stopped.

At block 401 of FIG. 5, a user performs operation to shift to the operating environment 205 of the secondary OS. At block 403, a new runtime image is created for the primary OS 103 by the procedure similar to block 331, and at block 405, the computer shifts to the switching suspend state. At block 407, the SMI handler calculates a digest P of the runtime image of the primary OS 103 by the same procedure as at block 335, encrypts it with the private key C and stores it at the physical address space 161. At block 409, the system firmware 101 calculates a digest S' of the runtime image of the secondary OS 113 before activating the secondary OS 113 similarly to block 337.

At block 411, similarly to block 339, the system firmware 101 decrypts the encrypted digest S that is stored at the physical address space 163 with the public key C. When comparison at block 413 similar to block 341 between the digest S and the digest S' results in disagreement, the system firmware 101 stops activation of the secondary OS 113 at block 415. When they agree, the procedure shifts to block 327 of FIG. 4, where the system firmware passes the access right of the CPU 11 to the secondary OS 113 for activation. Then the system context is restored, and the secondary OS 113 restores the state when the runtime image is created at block 331.

Figure 7:
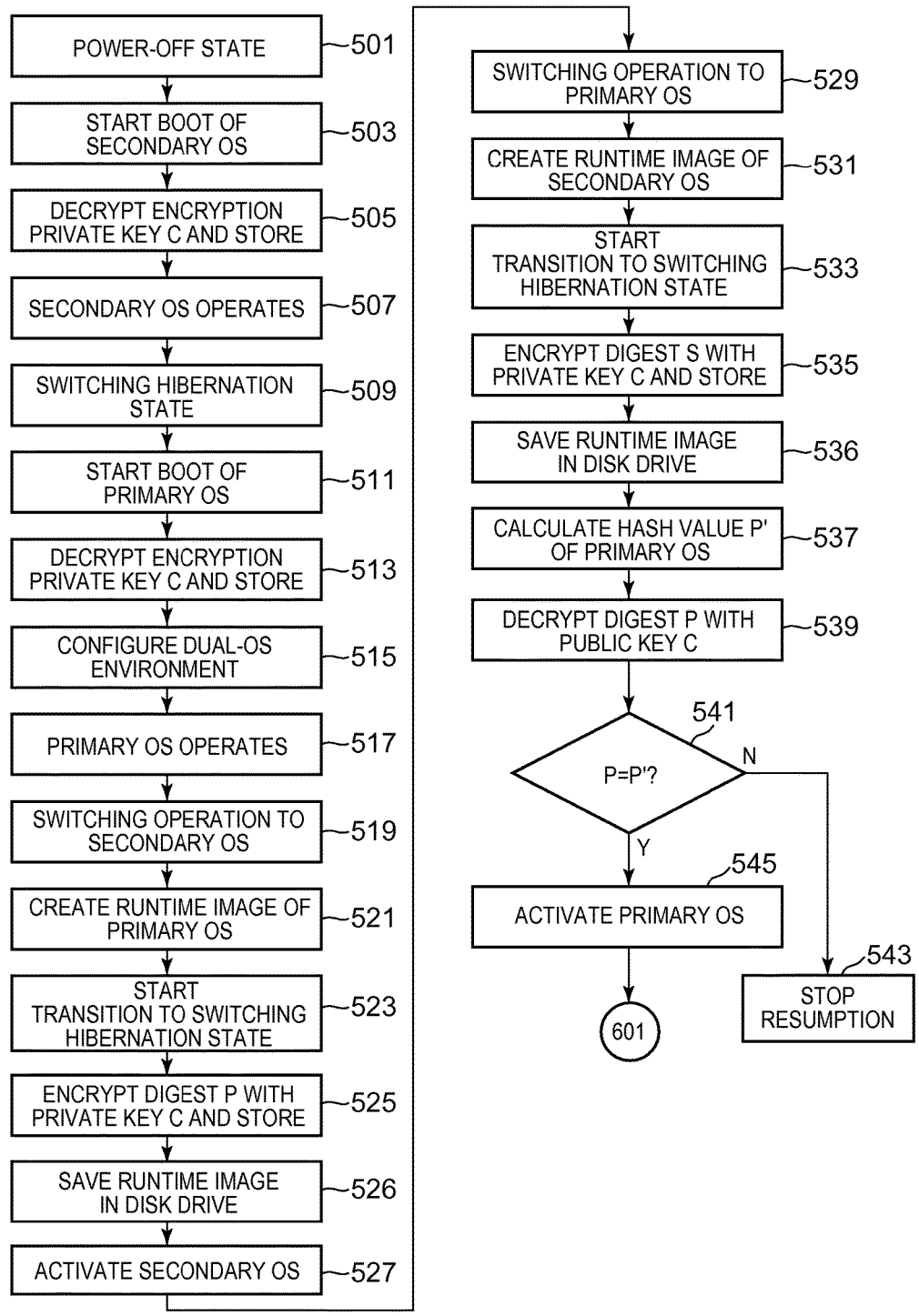
FIG. 7 is a flowchart to describe procedure to protect a backup file that is saved in a system memory in dual-OS operating environment.
Figure 8:
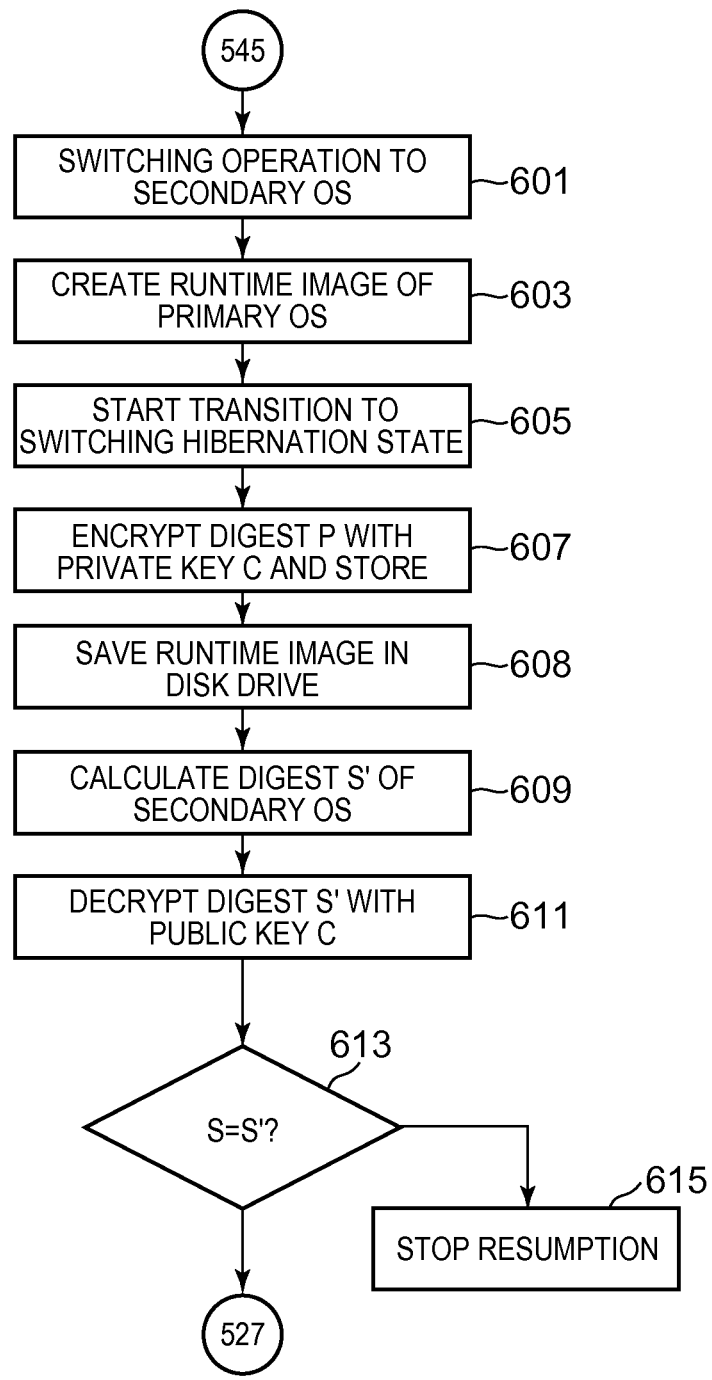
FIG. 8 is a flowchart to describe procedure to protect a backup file that is saved in a system memory in dual-OS operating environment.
Figure 9:
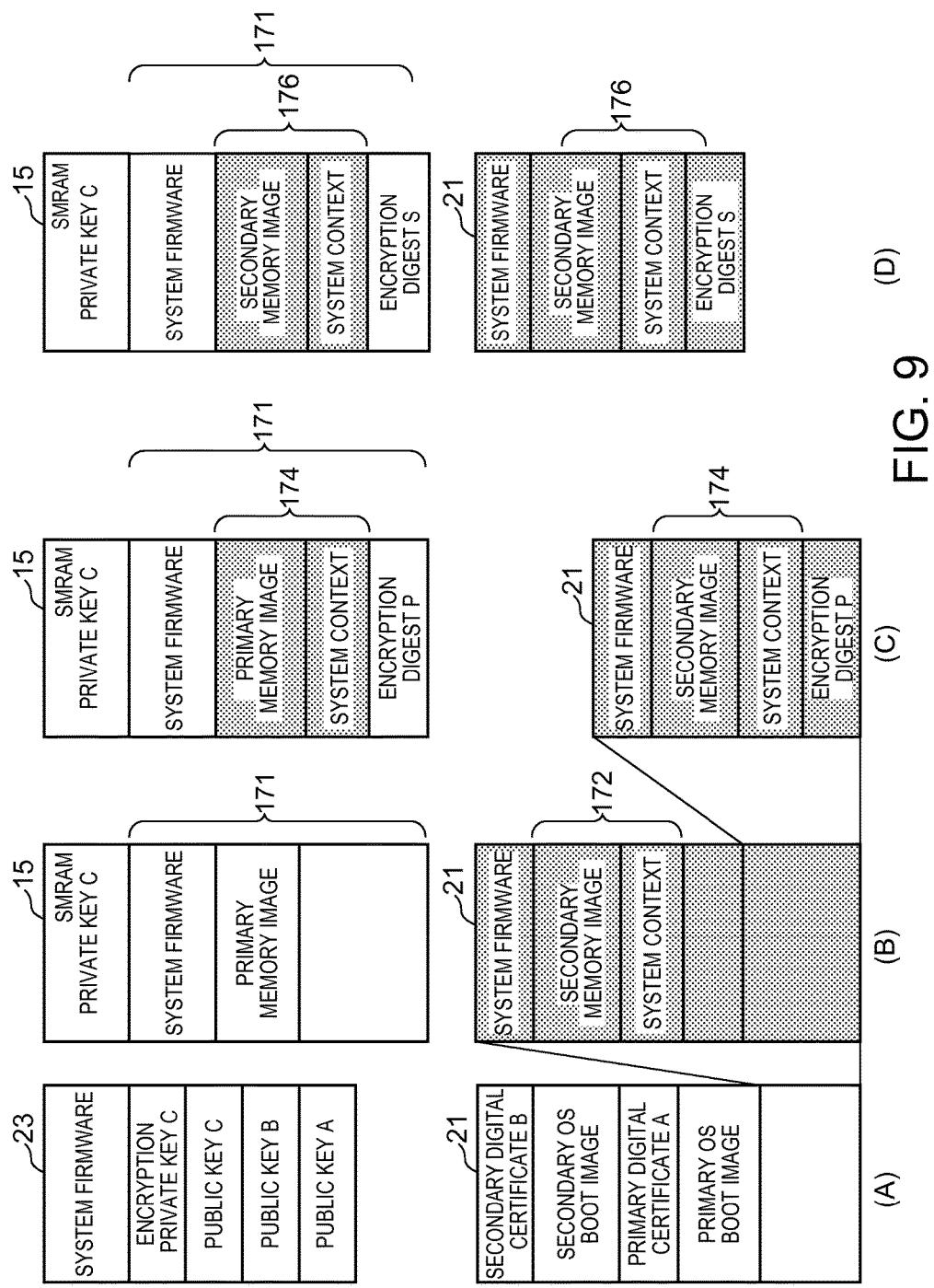
FIG. 9 describes transition of a data configuration of the system memory and the disk drive corresponding to FIGS. 7 and 8.

FIGS. 7 and 8 are flowcharts to describe the procedure to protect a backup file that is saved in the disk drive 21 in the dual-OS operating environment. FIG. 9 describes corresponding transition of data configuration in the system memory 15 and the disk drive 21. The procedure similar to the procedure of FIGS. 4 and 5 and the procedure that can be easily considered by analogy from the procedure of FIGS. 4 and 5 will be described simply. A runtime image of the present embodiment may be saved at a non-volatile memory that is different from the disk drive 21.

At block 501 of FIG. 7, the firmware ROM 23 and the disk drive 21 have a data configuration as in FIG. 9(A) similarly to FIG. 6(A). At block 503, in one example, the system firmware 101 loads a boot image of the secondary OS 113 first to a physical address space 171. The following describes an example where a boot image of the primary OS 103 or the secondary OS 113 is loaded to the physical address space 171. At block 505, similarly to block 305, the system firmware 101 decrypts the encrypted private key C and stores it at a SMRAM area.

At block 507, the secondary OS 113 operates, and at block 509, a runtime image 172 (FIG. 9(B)) is automatically saved at the disk drive 21 and the power supply of the computer 10 is stopped once, so that the computer transits to the switching hibernation state 215. The runtime image 172 that is saved in the disk drive 21 is a backup file. As the computer transits to the switching hibernation state 215, then the power supply is immediately turned on and the reset CPU 11 executes the system firmware 101. At block 511, the system firmware 101 refers to the register 35 and loads the boot image 131 of the primary OS to the physical address space 171.

At block 513, similarly to block 313, the system firmware 101 decrypts the encrypted private key C and stores it at the SMRAM area. At block 515, a dual-OS operating environment 200 is configured. In the dual-OS operating environment 200 that is configured using the disk drive 21, one of the operating environment 203 of the primary OS and the secondary OS1 operates, and the other operating environment is saved in the disk drive 21.

FIG. 9(B) shows the data configuration of the system memory 15 and the disk drive 21 when the primary OS 103 operates at block 517. At block 519, switching operation to the primary OS 103 is performed, and at block 521, the primary OS 103 creates a runtime image 174 similarly to block 321. At block 523, the system starts to shift to the switching hibernation state 215, and the reset CPU 11 executes the system firmware 101.

At block 525, a SMI handler calculates a digest P of the runtime image 174, encrypts it with the private key C and stores it at the system memory 15. At block 526, the system firmware 101 saves a file in the physical address space 171 containing the runtime image 174 and the encrypted digest P at a storage area that is different from that for the backup file of the secondary OS 113 in the disk drive 21, and restarts the power supply. FIG. 9(C) shows the data configuration of the system memory 15 and the disk drive 21 at this time as the saving destination.

At block 527, the secondary OS 113 is activated, and at block 529, switching operation to the primary OS 103 is performed. At block 531, the secondary OS 113 starting to operate creates a runtime image 176, and at block 533, the system firmware 101 starts to shift to the switching hibernation state 215. At block 535, the system firmware 101 calculates a digest S of the runtime image 176 and stores it at the system memory 15, and then the SMI handler encrypts the digest S with the private key C. At block 536, the system firmware 101 saves the encrypted digest S and the runtime image 176 in the disk drive 21, and restarts the power supply. At this time, the runtime image 176 may overwrite the runtime image 172 that is saved at block 526.

FIG. 9(D) shows the data configuration of the system memory 15 and the disk drive 21 at this time. At block 537, the system firmware 101 calculates a digest P' of the runtime image 174 of the primary OS that is read from the disk drive 21. The system firmware 101 decrypts the encrypted digest P that is read from the disk drive 21 with the public key C at block 539, and compares it with the digest P' at block 541. When they agree, at block 545, the system firmware 101 resumes the runtime image 174 of the primary OS for activation, and at block 521, restores the runtime image 174 to the state of creation. When they do not agree, at block 543, the system firmware 101 stops resumption of the runtime image 174 of the primary OS.

At block 601 of FIG. 8, switching operation to the operating environment 205 of the secondary OS is performed. At the procedure from block 603 to block 608, similarly to the procedure from block 521 to block 526, the primary OS 103 creates a runtime image at block 603. At block 605, the system firmware 101 starts switching operation to the switching hibernation state 215. At block 607, the system firmware 101 calculates a digest P of a new runtime image and encrypts it with the private key C, and at block 608, saves the new runtime image and the new encrypted digest P at the disk drive 21.

At the procedure from block 609 to block 615, similarly to the procedure from block 537 to block 543, the system firmware 101 calculates a digest S' of the runtime image 176 of the secondary OS that is read from the disk drive 21 at block 609. The system firmware 101 decrypts the encrypted digest S that is read from the disk drive 21 with the public key C at block 611, and compares it with the digest S' at block 613. When they agree, at block 527, the system firmware 101 resumes the runtime image 176 of the secondary OS for activation, and at block 531, restores the runtime image 176 to the state of creation. When they do not agree, at block 615, the system firmware 101 stops resumption of the runtime image 176 of the secondary OS.

The procedure from FIG. 4 to FIG. 9 is one example to describe one embodiment of the present application, and the present application is not limited to this procedure. Division of the procedure into a plurality of steps, integration or replacement thereof may be included in the present application as long as a person skilled in the art could easily expect them. The processing of a file specifically described in the specification may be performed by another known processing to implement equivalent functions, which may be included in the present application as long as it achieves the equivalent advantageous effects.

In the above-mentioned procedure, the system firmware 101 only accesses the private key C to encrypt a digest P or S, and can verify integrity of a runtime image in a safe environment disconnected from a network. The TPM may be used to verify integrity of the system firmware 101, and then processing can be performed in more safe environment. A runtime image may be created by using the procedure of transition to the suspend state or the hibernation state that is specified by the ACPI, and so any change to the OS is not required.

The aforementioned method uses the digest P or S that enables verification of the identity of a runtime image, or at least at a part thereof, with a small amount of data, and the present application is not limited to the usage of a digest. Instead of a digest, a representative file that enables verification of the identity of the runtime image at least a part thereof, may be used. Such a representative file may be the entire runtime image or a major part only such as a kernel.

The present application is applicable not only to multi-OS operating environment that is configured in physical environment but also to the protection of a runtime image of an OS that stops the operation in a plurality of OSs operating in virtual environment. The present application is applicable also to a method of switching operating environments such that a small physical address space may be formed in a physical address space of a large-scale OS, and the small-scale OS is operated in the small physical address space while letting the large-scale OS in the suspend state.

Since the private key C to encrypt the digest P, S of a runtime image has a large size, it is sometimes difficult to store it in the lockable NVRAM 27. It may be sealed with the TPM, and then such a private key can be stored in a non-volatile memory that is not lockable, such as the firmware ROM 23. In the present application, a common key (symmetric key) may be used to encrypt digest P, S. Since the common key has a small size compared to the private key, it can be stored in the lockable NVRAM 27 for protection, to which the CRTM only can access. At this time, the CRTM cancels the lock of the NVRAM only when storing the common key in the SMRAM area, and locks the NVRAM after taking the common key for protection of the common key.

The above describes the example where the encrypted digest P, S is saved in the system memory 15 or the disk drive 21 similarly to the runtime images 164, 166, 174 and 176, and the place to save the encrypted digest P, S is not limited to this example. The encrypted digest P, S may be stored in the lockable NVRAM 27, or may be saved in another non-volatile memory, including one that is not equipped with a lock function.

The present application may be embodied with hardware elements such as an encryption unit, a save unit, a decryption unit or a comparison unit that is configured in corporation with the hardware shown in FIG. 1 and the software shown in FIG. 2. For instance, the encryption unit can encrypt a representative file that is extracted from a runtime image stored in the system memory 15, and the save unit can save the runtime image in the system memory 15 or the disk drive 21. The decryption unit can decrypt the encrypted representative file, and the comparison unit can compare the representative file extracted from the saved runtime image with the decrypted representative file.

That is the description of the present application by way of specific embodiments illustrated in the drawings. The present application is not limited to the embodiments illustrated in the drawings, and any known configuration can be used as long as it has the effects of the present application.

What is claimed is:

1. A method comprising:
   in response to switching operation of a computer from a first operating system to a second operating system, encrypting a representative file enabling verification of identity of the first operating system;
   saving a first memory image comprising the first operating system at a selected location in non-volatile memory, and saving the encrypted representative file with the first memory image;
   decrypting the encrypted representative file in response to switching operation from the second operating system to the first operating system; and
   comparing a file representative of the first operating system with the decrypted representative file in response to decrypting the encrypted representative file, wherein the file representative of the first operating system is calculated based on the first memory image and the decrypted representative file is calculated based on the first operating system, comparing the file representative of the first operating system with the decrypted representative file comprises determining whether the file representative of the first operating system matches the decrypted representative file, a system firmware causes the computer to execute the encrypting, the saving, the decrypting, and the comparing, and the encrypting includes:
      creating a public key and an encrypted private key; and
      storing a decrypted private key.

2. The method of claim 1, wherein the representative file is a digest that is created by hashing at least a portion of the first memory image.

3. The method of claim 1, wherein the encrypting includes using an encryption key that is stored at a SMRAM area.

4. The method of claim 1, wherein the decrypted private key is stored at a SMRAM area.

5. The method of claim 1, wherein encryption and decryption of the private key is performed by a security chip.

6. The method of claim 1, wherein the encrypting and the decrypting include using a common key that is stored in the non-volatile memory, which is accessible only to the system firmware.

7. The method of claim 1, wherein the selected location is a disk drive that stores boot images of the first operating system and the second operating system.

8. The method of claim 1, further comprising:
   in response to switching operation from the second operating system to the first operating system, encrypting a representative file enabling verification of identity of at least a portion of a second memory image, the second memory image comprising the second operating system;
   saving the second memory image at a selected location in the non-volatile memory;
   decrypting the encrypted representative file in response to switching operation from the first operating system to the second operating system; and
   comparing a file representative of the saved second memory image with the decrypted representative file.

9. The method of claim 1, further comprising:
   decrypting the encrypted representative file before the first operating system transits to an active state in response to a resume operation; and
   stopping the resumption when the decrypted representative file and a representative file extracted from the memory image kept in the non-active state do not agree.

10. The method of claim 9, wherein encrypting a representative file includes:
    transitioning to an execution environment of a system firmware in response to the switching operation; and
    operating the system firmware to make the computer implement a function to encrypt the representative file and decrypt the representative file.

11. The method of claim 10, wherein the system firmware causes the computer to implement a function to compare the decrypted representative file and a representative file that is extracted from the memory image kept in a non-active state.

12. A program product comprising a non-transitory computer readable storage medium that stores code executable by a processor to perform:
    in response to switching operation from a first operating system to a second operating system, encrypting a representative file enabling verification of identity of the first operating system;
    saving a first memory image comprising the first operating system at a selected location in non-volatile memory, and saving the encrypted representative file with the first memory image;
    decrypting the encrypted representative file in response to switching operation from the second operating system to the first operating system; and
    comparing a file representative of the first operating system with the decrypted representative file in response to decrypting the encrypted representative file, wherein the file representative of the first operating system is calculated based on the first memory image and the decrypted representative file is calculated based on the first operating system, comparing the file representative of the first operating system with the decrypted representative file comprises determining whether the file representative of the first operating system matches the decrypted representative file, a system firmware causes execution of the encrypting, the saving, the decrypting, and the comparing, and the encrypting includes:
       creating a public key and an encrypted private key; and
       storing a decrypted private key.

13. The program product of claim 12, wherein the code is further executable to perform encrypting and the decrypting include using a common key that is stored in a non-volatile memory, which is accessible only to the system firmware.

14. The computer program of claim 12, wherein the code is further executable to perform:
    decrypting the encrypted representative file before resuming the first operating system in response to a resume operation; and
    stopping the resumption when the decrypted representative file and a representative file extracted from the memory image kept in a saved state do not agree.

15. A computer capable of operating in any one of a plurality of operating systems, comprising:
- a processor;
- a volatile memory that stores a program executed by the processor;
- a disk drive that stores the plurality of operating systems that can be booted;
- a user interface enabling switching operation;
- an encryption unit that encrypts a representative file that is extracted from a memory image stored in the volatile memory in response to switching operation from a first operating system to a second operating system, wherein the representative file enables verification of identity of the first operating system;
- a save unit that saves the memory image comprising the first operating system at a predetermined place in non-volatile memory, and saves the encrypted representative file with the first memory image;
- a decryption unit that decrypts the encrypted representative file in response to switching operation from the second operating system to the first operating system;
- a comparison unit that compares a representative file of the first operating system with the decrypted representative file in response to decrypting the encrypted representative file, wherein the file representative of the first operating system is calculated based on the first memory image and the decrypted representative file is calculated based on the first operating system, and comparing the file representative of the first operating system with the decrypted representative file comprises determining whether the file representative of the first operating system matches the decrypted representative file; and
- a system firmware that causes the computer to execute the encrypting, the saving, the decrypting, and the comparing, and the encrypting includes:
  - creating a public key and an encrypted private key; and
  - storing a decrypted private key.

16. The computer of claim 15, further comprising the non-volatile memory that stores the system firmware including a module making up the encryption unit and the decryption unit.

17. The computer of claim 16, further comprising a security chip that encrypts a key to encrypt the representative file and decrypts the key using values stored in secure registers in response to a request from the system firmware.

18. The computer of claim 15, wherein the selected location is a non-volatile storage that is different from the disk drive.

* * * * *